United States Patent
Maurice et al.

(10) Patent No.: US 7,082,647 B2
(45) Date of Patent: Aug. 1, 2006

(54) SNAP-HOOK FOR CARRYING ACCESSORIES

(75) Inventors: Alain Maurice, Saint Hilaire du Touvet (FR); Paul Petzl, Barraux (FR); Anne Bauvois, Hurtieres (FR)

(73) Assignee: Zedel, Crolles (FR)

( * ) Notice: Subject to any disclaimer, the term of this patent is extended or adjusted under 35 U.S.C. 154(b) by 0 days.

(21) Appl. No.: 10/949,355

(22) Filed: Sep. 27, 2004

(65) Prior Publication Data

US 2005/0071961 A1 Apr. 7, 2005

(30) Foreign Application Priority Data

Oct. 6, 2003 (FR) .................................. 03 11658

(51) Int. Cl.
*F16B 45/02* (2006.01)

(52) U.S. Cl. ................. 24/3.12; 24/598.2; 24/599.4
(58) Field of Classification Search ............... 24/599.1, 24/3.6, 599.4, 3.12, 600.9, 343, 601.3, 599.6–599.8, 24/598.2; 224/269
See application file for complete search history.

(56) References Cited

U.S. PATENT DOCUMENTS

| 437,380 | A | * | 9/1890 | Lundborg | .................. 24/600.9 |
| 1,349,468 | A | * | 8/1920 | Morrison | ...................... 24/3.6 |
| 1,622,532 | A | * | 3/1927 | Morse | ........................... 24/3.6 |
| 1,834,863 | A | * | 12/1931 | Palmore | ....................... 24/3.6 |
| 3,090,826 | A |  | 5/1963 | Cochran |  |
| 4,113,156 | A | * | 9/1978 | Brito | .......................... 224/666 |
| 4,319,704 | A | * | 3/1982 | Rosen | ........................ 224/270 |
| 5,187,844 | A |  | 2/1993 | Simond |  |
| 5,384,943 | A |  | 1/1995 | LeFebvre et al. |  |
| 5,619,774 | A | * | 4/1997 | Perry | ........................... 24/3.6 |
| 5,913,479 | A | * | 6/1999 | Westwood, III | ............. 24/298 |
| 6,601,274 | B1 | * | 8/2003 | Gartsbeyn | .................. 24/599.8 |

FOREIGN PATENT DOCUMENTS

DE 201 08 512 U1 1/2002

* cited by examiner

*Primary Examiner*—James R. Brittain
(74) *Attorney, Agent, or Firm*—Oliff & Berridge, PLC

(57) ABSTRACT

The body of a snap-hook for carrying accessories is equipped with a guard lug attached to the top part and extending facing the lateral branch opposite the finger so as to define a groove designed to be inserted on a support element, in particular a belt, to achieve immobilization of the snap-hook.

8 Claims, 3 Drawing Sheets

SNAP-HOOK FOR CARRYING ACCESSORIES

BACKGROUND OF THE INVENTION

The invention relates to a snap-hook designed to be used for climbing and for working at heights, comprising a body in the form of a hook for hooking a plurality of belaying accessories thereon, a movable finger articulated on one of the ends of the body to close or open the access passage of the hook, and return means biasing the finger to the closed position.

STATE OF THE ART

In climbing and mountaineering, climbers are used to hooking different types of accessories onto a carrier snap-hook secured to the belt of the body harness or sit harness. Depending on the type of climb, the accessories can be slings, descenders, ascenders, ice pegs, pitons, jammers, and so on. Passing the carrying snap-hook with clearance around the belt is liable to lead to more or less pronounced rocking movements when the climber progresses up his climbing face. The inconvenience caused by these rocking movements can even become a nuisance for the climber depending on the weight of the accessories carried.

OBJECT OF THE INVENTION

The object of the invention is to remedy these shortcomings, and the invention aims to provide a snap-hook for carrying accessories avoiding any relative displacement movement around the belt onto which it is hooked.

According to the invention, this object is achieved by the fact that the body of the snap-hook is equipped with a guard lug attached to the top part and extending facing the lateral branch opposite the finger so as to define a groove designed to be inserted on a support element to achieve immobilization of the snap-hook.

According to a preferred embodiment, the guard lug presents a smaller length than that of the lateral branch of the body. The groove bounded by the guard lug has a substantially uniform thickness, the free end of the guard lug being curved for ease of insertion on the support element after the movable finger has been opened.

The pivoting pin of the movable finger is preferably situated at the end of the top part of the body, and the top part of the body comprises a substantially flat external support surface for provisional placing of the accessories after the finger has been opened. In addition, the external support surface is provided with a plurality of ribs for placing the accessories side by side.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF A PREFERRED EMBODIMENT

Figure 1:
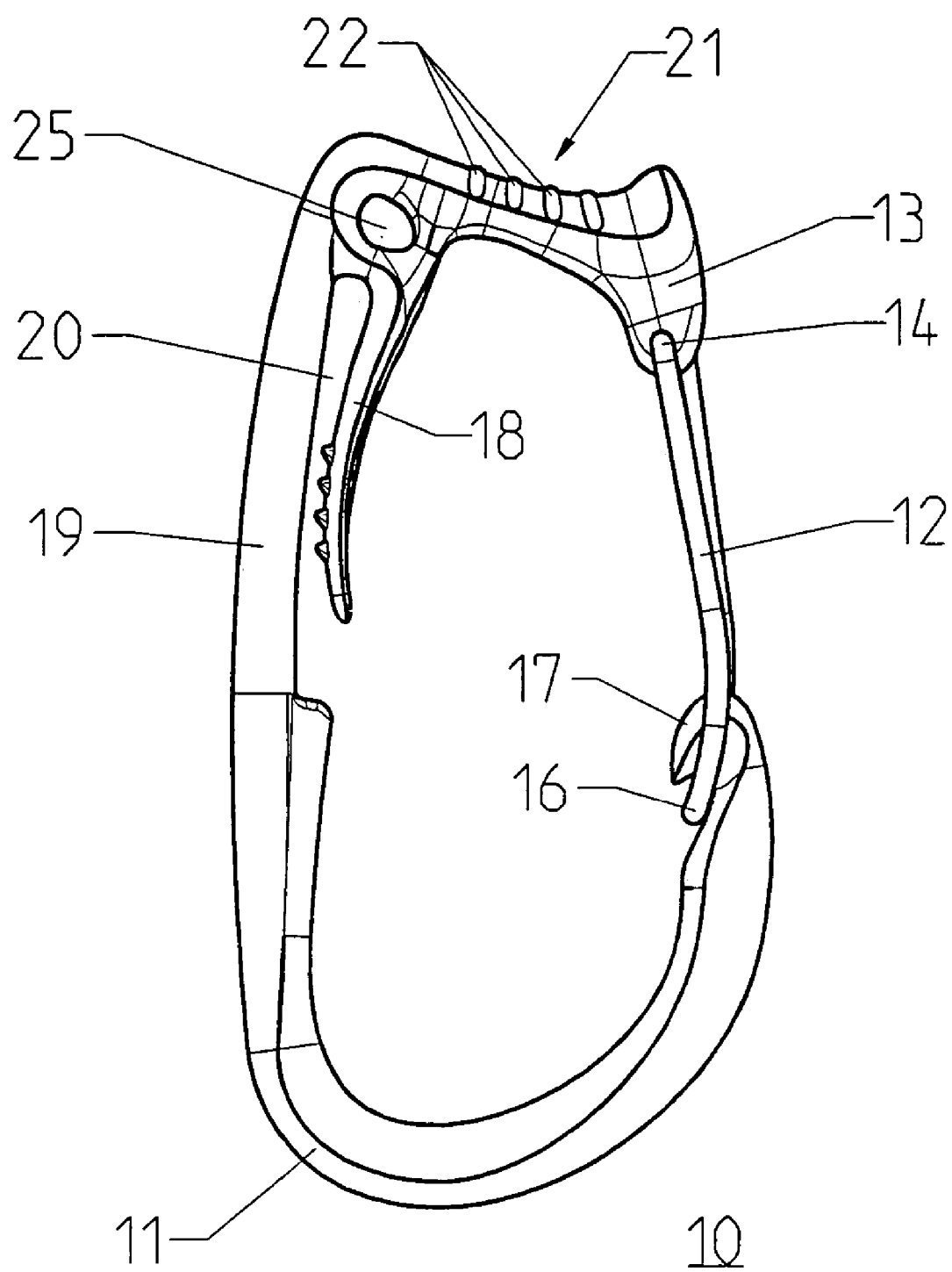
FIG. 1 is an elevation of the snap-hook according to the invention, the movable finger being represented in the closed position.

In FIGS. 1 to 4, a snap-hook 10 used for carrying belaying accessories comprises a body 11 in the form of a hook and a movable finger 12 articulated on one of the ends 13 of the body 11 to close or open the access opening of the hook.

For example, the finger 12 is made of steel wire shaped into a pin. It is provided with two spigots 14, 15 curved into a bracket and inserted in offset orifices arranged at the top part in the end 13. The finger 12 in addition comprises a latching head 16 operating in the closed position in conjunction with the bottom end 17 of the body 11. The offset arrangement of the spigots 14, 15 constitutes a flexible return means of the finger 12 to the closed position.

Inside the body 11, there is located a guard lug 18 attached to the top part of the body 11 and extending facing the lateral branch 19 opposite the finger 12. The guard lug 18 is of smaller length than the lateral branch 19 and defines a groove 20 with the latter. The thickness of the groove 20 is substantially uniform so as to enable the guard lug 18 to be inserted on a support element (not shown), for example a belt or a harness.

The end of the guard lug 18 is advantageously curved for ease of fitting on the support element.

The top part of the body 11 comprises a substantially flat external support surface 21 to allow accessories to be placed provisionally after the finger 12 has been opened. The support surface 21 is preferably equipped with a plurality of ribs 22 for the accessories to be placed side by side.

Figure 2:
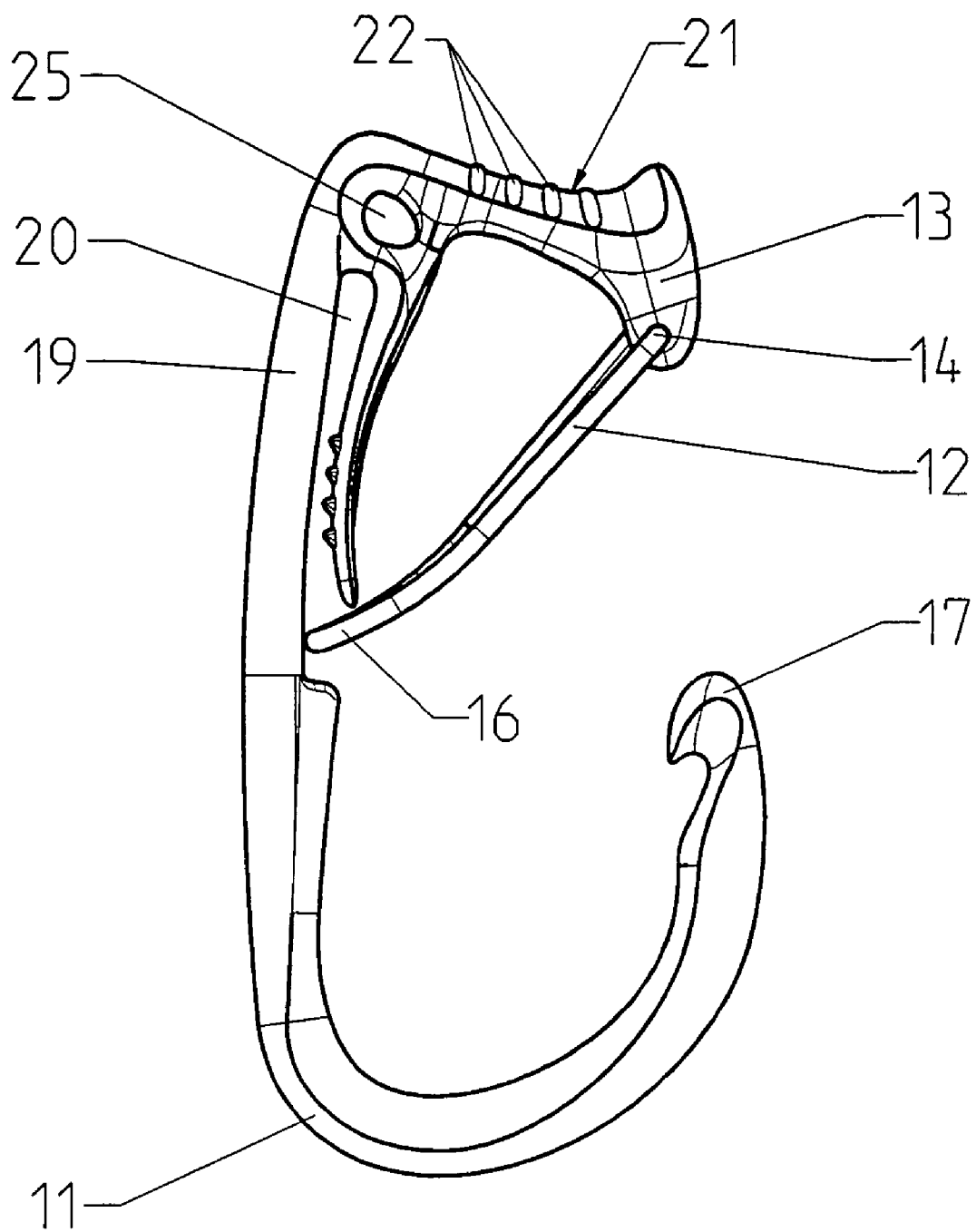
FIG. 2 is an identical view to FIG. 1 in the open position of the finger.
Figure 3:
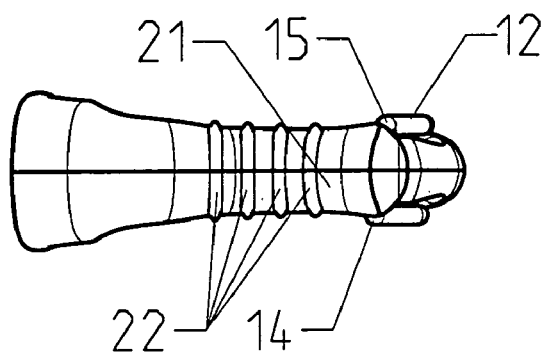
FIG. 3 shows a top view of FIG. 1.
Figure 4:
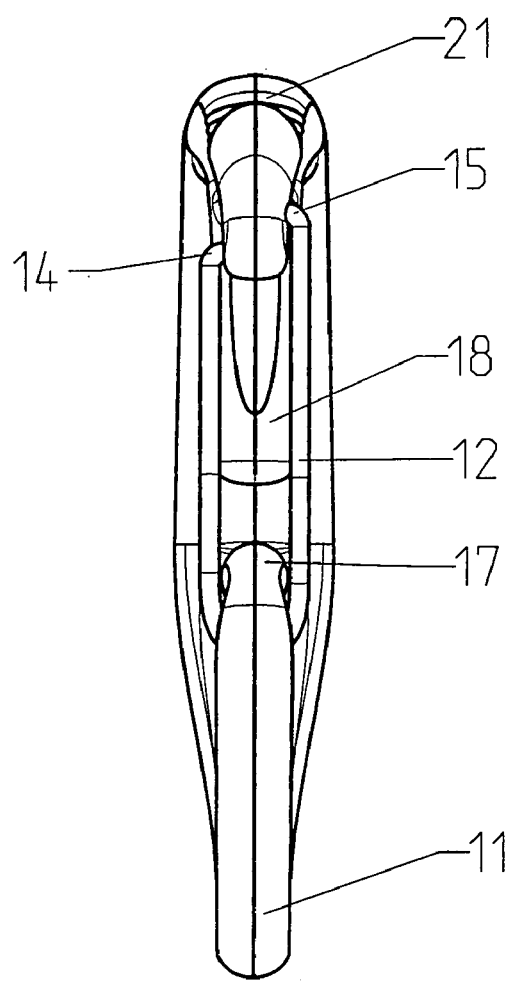
FIG. 4 illustrates a side view of FIG. 1.

The pivoting pin of the movable finger 12 is advantageously arranged at the top part of the body, and opening takes place towards the inside of the body 11 without the finger 12 coming up against the guard lug 18 (FIG. 2).

A hole 25 is provided in the top part of the body 11 for attachment of a piece of string designed to secure the transported accessories and tools.

The invention claimed is:

1. A snap-hook designed to be used for climbing and for working at heights, comprising:

a body in the form of a hook for hooking a plurality of belaying accessories thereon, the body including two ends and an access passage;

a movable finger articulated on an end at a top part of the body to close or open said access passage of the hook;

return means biasing the finger to the closed position; and a guard lug having a length and fixedly attached at one end of the length to the top part inside the body and extending from the top part while facing a lateral branch opposite the finger so as to define a groove designed to be inserted on a support element to achieve immobilization of the snap-hook, wherein the groove narrows along an initial portion of the length extending from the body to an approximate center of the guard lug, and wherein the movable finger has a pivoting pin situated at the end of the top part of said body.

2. Snap-hook according to claim 1, wherein the guard lug presents a smaller length than that of the lateral branch of the body.

3. Snap-hook according to claim 2, wherein the groove bounded by the guard lug narrows slightly along a portion of the length and has a substantially uniform thickness.

4. Snap-hook according to claim 3, wherein the guard lug has a free end located opposite its attachment point, is curved for ease of insertion on the support element after the movable finger has been opened.

5. Snap-hook according to claim 1, wherein the top part of the body comprises a substantially flat external support surface for provisional placing of the accessories after the finger has been opened.

6. Snap-hook according to claim 5, wherein the external support surface is provided with a plurality of ribs for placing the accessories side by side.

7. Snap-hook according to claim 5, wherein the movable finger is made of steel wire, movement to the open position taking place towards the inside of the body without coming up against the guard lug.

8. Snap-hook according to claim 1, wherein a hole is provided in the top part of the body on the same side as the guard lug for attachment of a piece of string.

* * * * *